United States Patent
Yeh et al.

(10) Patent No.: US 7,721,066 B2
(45) Date of Patent: May 18, 2010

(54) EFFICIENT ENCODING FOR DETECTING LOAD DEPENDENCY ON STORE WITH MISALIGNMENT

(75) Inventors: Tse-yu Yeh, Cupertino, CA (US); Daniel C. Murray, Morgan Hill, CA (US); Po-Yung Chang, Saratoga, CA (US); Anup S. Mehta, Fremont, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 11/758,193

(22) Filed: Jun. 5, 2007

(65) Prior Publication Data

US 2008/0307173 A1    Dec. 11, 2008

(51) Int. Cl.
*G06F 12/00* (2006.01)

(52) U.S. Cl. .................... 711/201; 711/5; 711/127; 711/157; 711/E12.079; 711/E12.047

(58) Field of Classification Search ............... 711/201, 711/5
See application file for complete search history.

(56) References Cited

U.S. PATENT DOCUMENTS

| | | | |
|---|---|---|---|
| 5,432,918 A * | 7/1995 | Stamm | 711/156 |
| 6,141,747 A | 10/2000 | Witt | |
| 6,219,759 B1 * | 4/2001 | Kumakiri | 711/137 |
| 6,446,157 B1 * | 9/2002 | McGehearty et al. | 711/5 |
| 6,622,235 B1 * | 9/2003 | Keller et al. | 712/23 |
| 6,871,266 B2 * | 3/2005 | Sturges et al. | 711/129 |
| 2004/0266027 A1 * | 12/2004 | Beat | 438/1 |
| 2005/0177673 A1 * | 8/2005 | Oberlaender | 711/3 |

OTHER PUBLICATIONS

Mark Hayter, "Zen and the Art of SOC Design," Microprocessor Summit 2006, Session MPS-960 High End Processors, P.A. Semi, Inc., 14 pages.
James B. Keller, "The PWRficient Processor Family," PA Semi, Oct. 2005, 31 pages.

* cited by examiner

*Primary Examiner*—Reginald G Bragdon
*Assistant Examiner*—Arvind Talukdar
(74) *Attorney, Agent, or Firm*—Lawrence J. Merkel; Meyertons, Hood, Kivlin, Kowert & Goetzel, P.C.

(57) ABSTRACT

In one embodiment, an apparatus comprises a queue comprising a plurality of entries and a control unit coupled to the queue. The control unit is configured to allocate a first queue entry to a store memory operation, and is configured to write a first even offset, a first even mask, a first odd offset, and a first odd mask corresponding to the store memory operation to the first entry. A group of contiguous memory locations are logically divided into alternately-addressed even and odd byte ranges. A given store memory operation writes at most one even byte range and one adjacent odd byte range. The first even offset identifies a first even byte range that is potentially written by the store memory operation, and the first odd offset identifies a first odd byte range that is potentially written by the store memory operation. The first even mask identifies bytes within the first even byte range that are written by the store memory operation, and wherein the first odd mask identifies bytes within the first odd byte range that are written by the store memory operation.

17 Claims, 5 Drawing Sheets

EFFICIENT ENCODING FOR DETECTING LOAD DEPENDENCY ON STORE WITH MISALIGNMENT

BACKGROUND

1. Field of the Invention

This invention is related to processors and, more particularly, to detecting load/store dependencies in processors.

2. Description of the Related Art

Processors generally include support for memory operations to facilitate transfer of data between the processors and memory to which the processors may be coupled. As used herein, a memory operation is an operation specifying a transfer of data between a processor and a main memory (although the transfer may be completed in cache). Load memory operations specify a transfer of data from memory to the processor, and store memory operations specify a transfer of data from the processor to memory. Memory operations may be an implicit part of an instruction which includes a memory operation, or may be explicit load/store instructions. Load memory operations may be more succinctly referred to herein as "loads". Similarly, store memory operations may be more succinctly referred to as "stores".

A given memory operation can specify the transfer of multiple bytes beginning at a memory address that is calculated during execution of the memory operation. For example, 16 bit (2 byte), 32 bit (4 byte), and 64 bit (8 byte) transfers are common in addition to an 8 bit (1 byte) transfer. In some cases, even 128 bit (16 byte) transfers are supported. The address is typically calculated by adding one or more address operands specified by the memory operation to generate an effective address or virtual address, which can optionally be translated through an address translation mechanism to a physical address of a memory location within the memory. Typically, the address can identify any byte as the first byte to be transferred, and the additional bytes of the multiple byte transfer are contiguous in memory to the first byte and stored at increasing (numerical) memory addresses.

Since any byte can be identified as the first byte, a given memory operation can be misaligned. Various processors define misalignment in different ways. In the strictest sense, a memory operation is misaligned if it is not aligned to a boundary that matches its data size (e.g. an 8 byte memory operation is misaligned if not aligned to an 8 byte boundary in memory, a 4 byte memory operation is misaligned if not aligned to a 4 byte boundary, etc.). Misaligned memory operations can, in some cases require additional execution resources (as compared to an aligned memory operation) to complete the access, and misalignment can be more loosely defined to be those cases in which additional resources are needed. For example, a processor often implements a cache having cache blocks. If one or more of the bytes operated upon by the memory operation are in one cache line and the remaining bytes are in another cache line, two cache lines are accessed to complete the memory operation as opposed to one cache line if the accessed bytes are included within one cache line.

Since memory operations can have arbitrary alignment and arbitrary size, dependency checking between loads and previous stores that have not yet completed is complicated. Often, a full cache block-sized mask is maintained for each incomplete store, identifying bytes within the cache block that are written by the store. A similar cache-block sized mask is generated for each load, and compared to the store masks. A dependency can thus be detected by comparing the cache block address of the store to the cache block address of the load (i.e. the address less the least significant bits that form an offset into the cache block) for equality, and detecting that at least one mask bit corresponding to the same byte is set in both the store mask and the load mask. However, storage for the masks is expensive.

SUMMARY

In one embodiment, an apparatus comprises a queue comprising a plurality of entries and a control unit coupled to the queue. The control unit is configured to allocate a first entry of the plurality of entries to a store memory operation, and is configured to write a first even offset, a first even mask, a first odd offset, and a first odd mask corresponding to the store memory operation to the first entry. A group of contiguous memory locations are logically divided into alternately-addressed even and odd byte ranges, wherein a number of bytes in each byte range is an integer greater than one. A given store memory operation writes at most one even byte range and one adjacent odd byte range. The first even offset identifies a first even byte range in the group of contiguous memory locations that is potentially written by the store memory operation, and the first odd offset identifies a first odd byte range in the group that is potentially written by the store memory operation. The first even mask identifies bytes within the first even byte range that are written by the store memory operation, and wherein the first odd mask identifies bytes within the first odd byte range that are written by the store memory operation.

BRIEF DESCRIPTION OF THE DRAWINGS

The following detailed description makes reference to the accompanying drawings, which are now briefly described.

Figure 1:
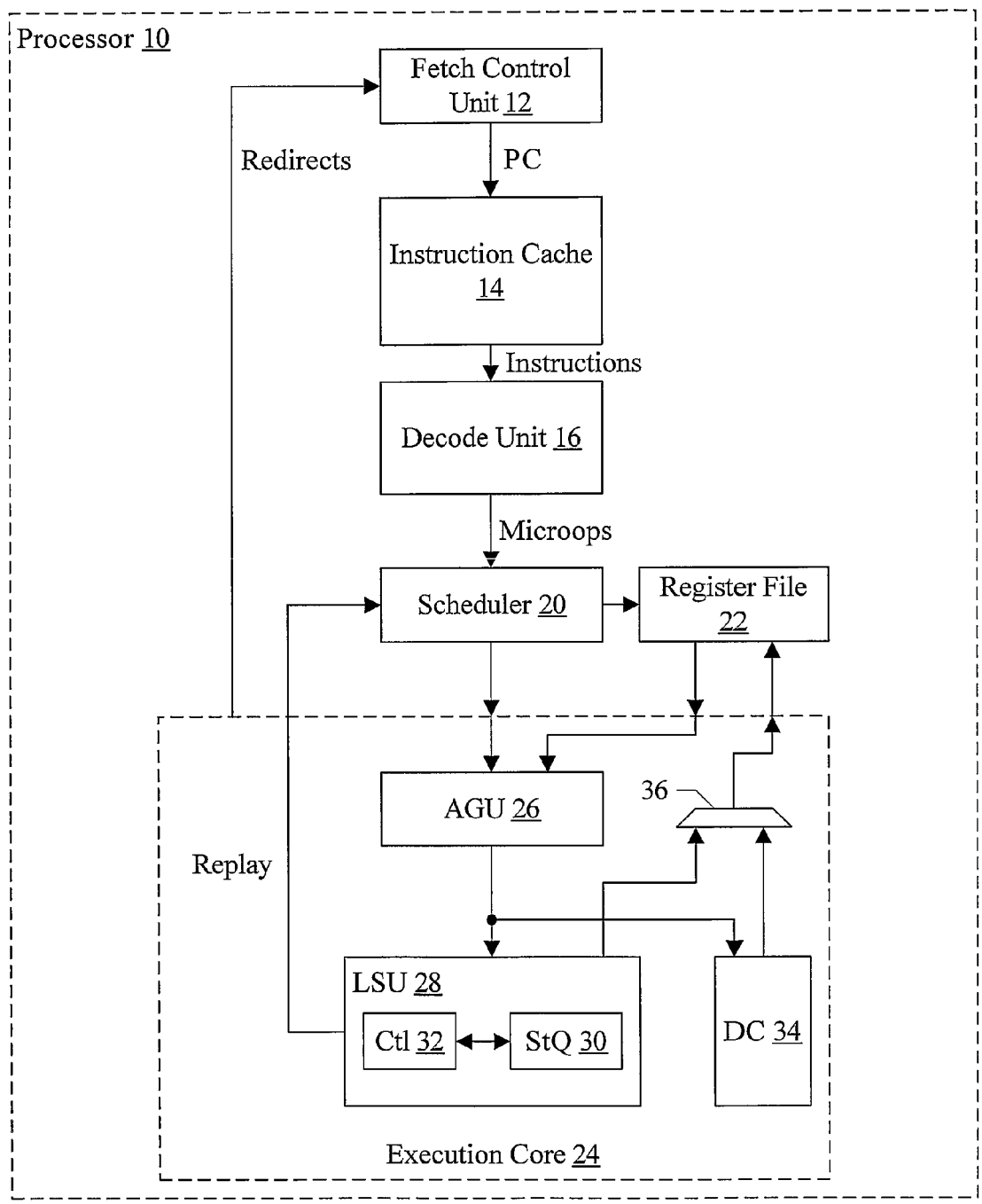
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Turning now to FIG. 1, a block diagram of one embodiment of a processor 10 is shown. In the illustrated embodiment, the processor 10 includes a fetch control unit 12, an instruction cache 14, a decode unit 16, a scheduler 20, a register file 22, and an execution core 24. The fetch control unit 12 is coupled to provide a program counter (PC) for fetching from the instruction cache 14, and is coupled to receive a redirect from the execution core 24. The instruction cache 14 is coupled to provide instructions to the decode unit 16, which is coupled to provide microops to the scheduler 20. The scheduler 20 is coupled to the register file 22, and is coupled to provide microops for execution to the execution core 24. The register file 22 is coupled to provide operands to the execution core 24 and to receive results from the execution core 24.

In the illustrated embodiment, the execution core 24 comprises an address generation unit (AGU) 26, a load/store unit (LSU) 28, a data cache (DC) 34, and a mux 36. The AGU 26 is coupled to receive load/store microops from the scheduler 20 and corresponding operands from the register file 22. The AGU 26 is coupled to provide an address accessed by the load/store microop to the LSU 28 and the data cache 34. The LSU 28 and data cache 24 may provide data input to the mux 36, which may select data to output to the register file 22. The LSU 28 includes a control unit 32 and a store queue (StQ) 30.

Specifically, the LSU 28 may queue stores in the store queue 30 until the stores are committed to the data cache 34 and/or to memory (via an interface unit configured to communicate external to the processor 10, for example). While the stores remain in the store queue, it is possible that loads dependent on the stores will be executed. The LSU 28 may detect the dependencies and either replay a dependent load (by signalling the scheduler 20, "Replay" in FIG. 1) or forward the store data as the result of the load through the mux 36. Generally, a load may be dependent on a store if the store writes at least one byte that is read by the load. If no dependency is detected, then cache data from the data cache 34 may be forwarded as the result of the load, if the load is a cache hit. Cache misses may be handled in any desired fashion, not shown in FIG. 1.

In one embodiment, store data may be forwarded as the load result if the store writes all bytes read by the load. Otherwise, the dependent load may be replayed (that is, the scheduler 20 may reschedule the load for execution at a later time). Other embodiments may support various levels of partial forwarding, where store data is merged with cache data to provide a load result.

The LSU 28 (and more particularly the control unit 32, in the illustrated embodiment) may perform dependency checking using the cache block addresses and reduced-sized masks, described in more detail below. That is, the data stored to represent which bytes within a cache block that are written by the store may be less than the size of a cache-block-sized mask. The reduced size may reduce the storage needed in the store queue 30 to store the masks, which may permit a smaller store queue structure, in some embodiments. A cache block may be the unit of allocation and deallocation of storage in the data cache 34. That is, a cache block is a contiguous group of memory bytes that are allocated space in the cache as a unit, and are deallocated from the cache as a unit. In one embodiment, a cache block may be 64 bytes in size (and aligned to a 64 byte boundary in memory). Other embodiments may use larger or smaller cache block sizes. Additionally, while dependency checking may be performed by comparing cache block addresses and other data representing bytes within the cache block which are written (for stores) and read (for loads), other embodiments may use other contiguous groups of memory bytes (larger or smaller than a cache block in size) over which to generate data for detecting dependencies (and may compare the remaining portions of the address for equality).

The decode unit 16 may be configured to generate microops for each instruction provided from the instruction cache 14. Generally, the microops may each be an operation that the hardware included in the execution core 24 is capable of executing. Each instruction may translate to one or more microops which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment. Alternatively, each instruction may map to one microop executed by the processor. Accordingly, an instruction operation (such as a memory operation) may be an operation derived from an instruction or may be a decoded instruction, as desired.

Microops generated by the decode unit 16 may be provided to the scheduler 20, which may store the microops and may schedule the microops for execution in the execution core 24. In some embodiments, the scheduler 20 may also implement register renaming and may map registers specified in the microops to registers included in the register file 22. When a microop is scheduled, the scheduler 20 may read its source operands from the register file 22 and the source operands may be provided to the execution core 24.

The execution unit 24 may include various execution units, in addition to the AGU 26 and the LSU 28 shown in FIG. 1. For example, the execution unit 24 may include one or more integer execution units to execute integer instructions, one or more floating point execution units to execute floating point instructions, one or more vector execution units to execute vector instructions, etc.

Memory operation microops may be scheduled to the address generation unit 26, which generates the address of the memory operation from the address operands. If address translation is enabled, the address generated by the address generation unit 26 may be an effective address or virtual address, to be translated to a physical address through the address translation mechanism. For example, the data cache 34 may include address translation hardware such as a translation lookaside buffer that stores the results of previous translations. Alternatively, separate memory management unit (MMU) hardware may be provided to perform translations, or the address generation unit 26 may include the MMU hardware.

The address generated by the address generation unit 26 may be provided to the data cache 34 and to the load/store unit 28. For loads that hit in the data cache 34, the data cache 30 may provide the corresponding data to the register file 22 for writing in the target register of the load. For stores, the store data may be provided to the load/store unit 28 for queuing in the store queue 30 until the store is committed, at which time the data cache 30 may be written with the store data. The load/store unit 28 may also enforce various load/store ordering rules, participate in cache miss handling, etc. Specifically, in one embodiment, the store queue 30 may be a combined load/store queue that also stores information for loads, to permit ordering violations to be detected, for exception handling, etc.

The register file 22 may generally comprise any set of registers usable to store operands and results of microops executed in the processor 10. In some embodiments, the register file 22 may comprise a set of physical registers and the scheduler 20 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache block size. For example, 64 byte cache block may be implemented in one embodiment. Other embodiments may use larger or smaller cache block sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The data cache 34 may be a cache memory for storing data accessed by loads and stored. The data cache 34 may also have any capacity and construction, and any cache block size.

It is noted that, while the illustrated embodiment uses a scheduler, other embodiments may implement other microarchitectures. For example, a reservation station/reorder buffer microarchitecture may be used. If in-order execution is implemented, other microarchitectures without out of order execution hardware may be used.

Load/Store Dependency Checking

In one embodiment, load/store dependency checking may be performed in the LSU 28 by comparing the cache block addresses for equality, and processing additional data representing the bytes within the cache block that are read or written. This example will be used in the remainder of the disclosure, although other groups of contiguous bytes may be divided into even and odd byte ranges as described herein for other embodiments.

The cache block may be logically divided into byte ranges, which may be alternately addressed as even and odd ranges according to the least significant bit of the offset for the byte range (excluding bits that are offsets into the particular byte range). For example, in the embodiment illustrated in FIG. 2, the 64 byte cache block may be divided into 8 byte ranges, and bit 60 (where bit 63 is the least significant bit) of the address indicates even or odd (zero being even, one being odd). Viewed in another way, the offset to the beginning of the byte range within the cache block may be even or odd.

The byte ranges may be selected so that the largest misaligned store may at most write bytes within two byte ranges (one even, and one odd, where the two ranges are adjacent). For example, in the present embodiment, an 8 byte store can be misaligned and thus at most can write one even and one odd byte range when the size of the range is 8 bytes. In one embodiment, a 16 byte store is also supported, but the 16 byte store is not permitted to be misaligned and thus such a store can also only write two adjacent byte ranges (and it will write all bytes in each range). Thus, the largest store of any type may at most write two adjacent byte ranges, one even and one odd.

Figure 2:
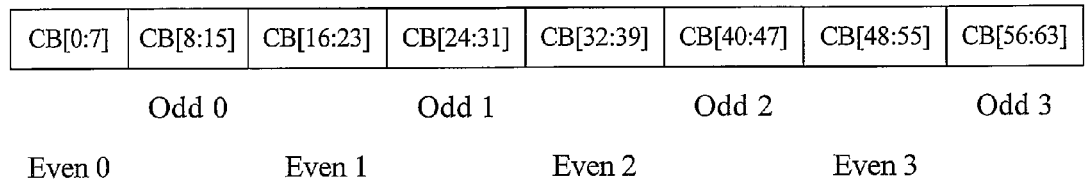
FIG. 2 is a block diagram illustrating one embodiment of a cache block and division into odd and even byte ranges.

As shown in FIG. 2, there are eight byte ranges, alternately even and odd, for 4 even ranges and 4 odd ranges total in this embodiment. Accordingly, the even range that corresponds to a given memory operation may be identified with a two bit encoding, and the odd range that corresponds to a given memory operation may be identified with another two bit encoding. While both an even and an odd range are identified, it is possible that only bytes from one of the two ranges are affected by the memory operations (e.g. an aligned 8 byte memory operation or a smaller operation may affect only one of the ranges). Thus, the even and odd ranges indicated for a given memory operation may be described as potentially affected by the memory operation. If the memory operation is a store, the even and odd byte ranges are potentially written by the store. If the memory operation is a load, the even and odd byte ranges are potentially read by the load.

Additionally, an even mask may be provided to identify which bytes within the even range are written by the given store or read by the given load (8 bits in the present embodiment, one bit per byte in the range), and an odd mask may be provided to identify which bytes within the odd range are written by the given store or read by the given load (8 bits in the present embodiment). If none of the bits of the even mask are set, none of the bytes in the even byte range are read/written. Similarly, if none of the bits of the odd mask are set, none of the bytes in the odd byte range are read/written. A total of 20 bits may be used to identify the read/written bytes, as compared to a 64 bit mask for the cache block as a whole.

Figure 3:
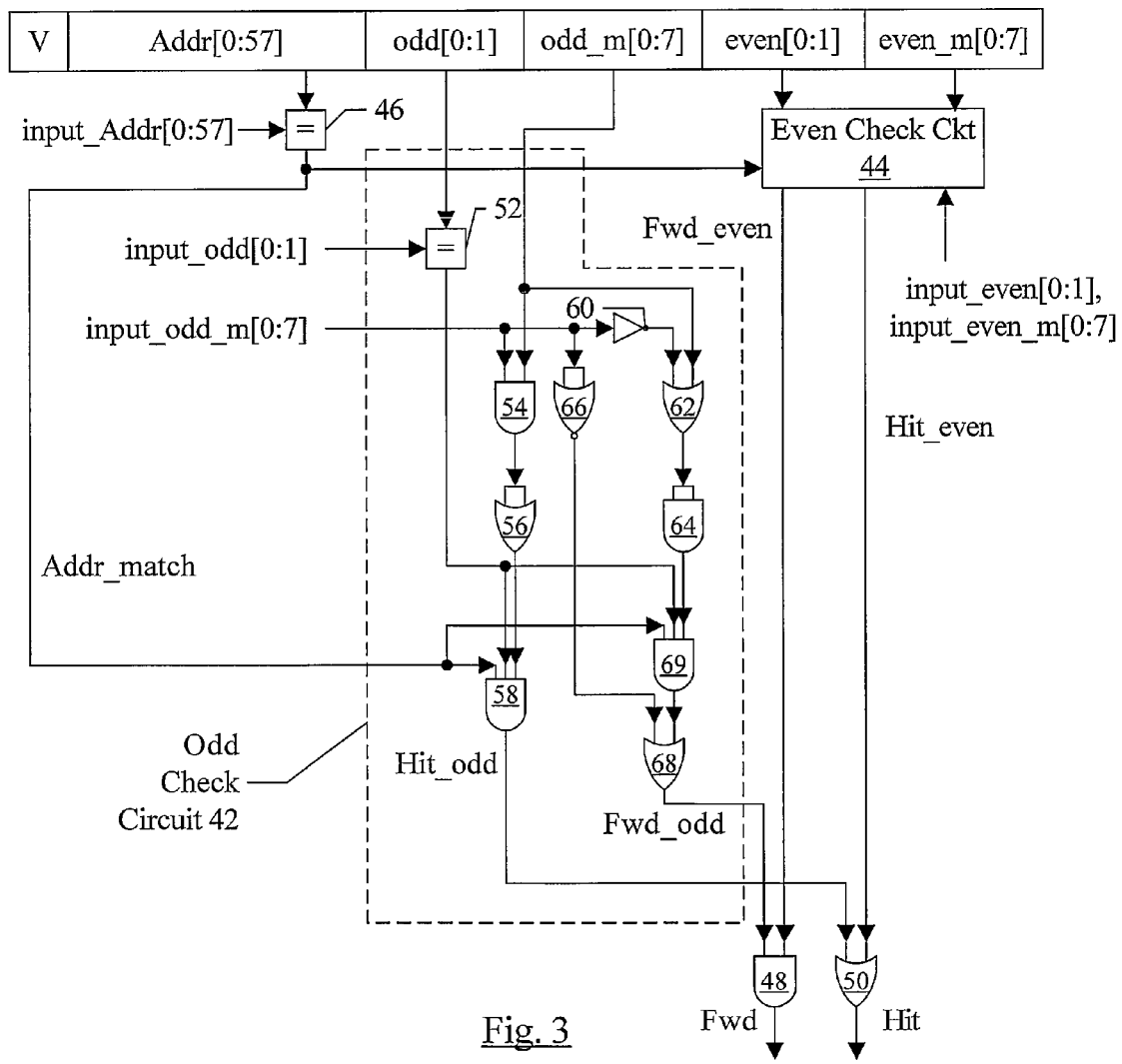
FIG. 3 is a block diagram illustrating one embodiment of a store queue entry and related logic.

FIG. 3 is a block diagram of an exemplary store queue entry 40 and related circuitry in the control unit 32 for detecting dependency of a load on the store. The store queue 30 may comprise a plurality of entries similar to the entry 40. The related circuitry includes odd check circuit 42 and even check circuit 44, as well as additional circuitry shown in FIG. 3 and described in more detail below. The even check circuit 44 may be similar to the odd check circuit 42, and thus is shown in block form only in FIG. 3.

The entry 40 includes a valid bit (V), an address field (Addr[0:57]), an odd offset field (odd[0:1]), an odd mask field (odd_m[0:7]), an even offset field (even[0:1]), and an even mask field (even_m[0:7]). The entry may also store various other information (e.g. the store data, a valid bit for the data, various protection bits, etc.) in various embodiments.

A comparator 46 is coupled to receive the cache block address field of the entry 40 (Addr[0:57]) as well as an input cache block address (input_Addr[0:57]). If the addresses match, the comparator may assert its output signal (Addr_match). If the addresses do not match, then the store represented by the entry 40 is not to the same cache block as the memory operation being executed, and thus there is no dependency. The Addr_match signal is provided to the even check circuit 44 and the odd check circuit 42.

The even check circuit 44 is coupled to receive the even offset and the even mask, as well as an input even offset and input even mask (input_even[0:1] and input_even_m[0:7], respectively) corresponding to a memory operation executed by the AGU 26. The even check circuit 44 is configured to output a Hit_even signal and a Fwd_even signal. The Hit_even signal, when asserted, indicates that the input hits the store in its even byte range. That is, at least one byte written by the store in the even byte range is accessed by the input. Thus, the Hit_even signal may be asserted if the even offset matches the input even offset and at least one set bit in the even mask is also set in the input even mask. The Fwd_even signal, when asserted, indicates that the store writes each byte that is accessed by the input within the even byte range. Thus, the Fwd_even signal may be asserted if the even offset matches the input even offset and each set bit in the input even mask is also set in the even mask.

Similarly, the odd check circuit 42 is coupled to receive the odd offset and the odd mask, as well as an input odd offset and input odd mask (input_odd[0:1] and input_odd_m[0:7], respectively) corresponding to a memory operation executed by the AGU 26. The odd check circuit 42 is configured to output a Hit_odd signal and a Fwd_odd signal. The Hit_odd signal, when asserted, indicates that the input hits the store in its odd byte range. That is, at least one byte written by the store in the odd byte range is accessed by the input. Thus, the Hit_odd signal may be asserted if the odd offset matches the input odd offset and at least one set bit in the odd mask is also set in the input odd mask. The Fwd_odd signal, when asserted, indicates that the store writes each byte that is accessed by the input within the odd byte range. Thus, the Fwd_odd signal may be asserted if the odd offset matches the input odd offset and each set bit in the input odd mask is also set in the odd mask.

If either the Hit_odd or Hit_even signal is asserted, then a dependency has been detected. In the illustrated embodiment, the Addr_match signal is incorporated into the Hit_odd and Hit_even determination, and thus the Hit_odd and Hit_even signals may be logically ORed to produce an output hit signal (represented by OR gate 50). If both the $Fwd_{13}$ odd and Fwd_even signals are asserted, then the store in the entry 40 writes all bytes accessed by the memory operation (assuming the Addr_match signal is asserted). Assuming the memory operation is a load (which may be verified by other circuitry, not shown in FIG. 3), the store data may be forwarded as the result of the load. The AND gate 48 represents logically ANDing the Fwd_odd and Fwd_even signals. The Fwd output signal may be used to forward store data as the load result.

Exemplary logic for the odd check circuit 42 is shown in FIG. 3. The logic is merely exemplary, and any circuitry may be used to generate the Hit_odd and Fwd_odd signals using the input information described above. Furthermore, any Boolean equivalents of any illustrated circuitry may be used.

A comparator 52 may compare the odd offset field and the input odd offset for equality. If the offsets are equal, then the same odd byte range in the cache block is being written by the store and accessed by the memory operation being executed. If the offsets are equal and at least one set bit in the input odd mask is matched by a set bit in the entry's odd mask, a hit is detected. The detection of at least one common set bit in the masks is represented in FIG. 3 by AND gate 54 and OR gate 56. The AND gate 54 may represent bitwise logically ANDing the masks. The OR gate 56 may represent logically ORing the result of the bitwise AND, and thus may output a binary one if there is at least one set bit in the bitwise AND result. Thus, the Hit_odd signal may be asserted if the output of the OR gate 56 is asserted, the output of the comparator 52 is asserted, and the Addr_match is asserted.

Detecting that each set bit in the input odd mask is matched by a corresponding set bit in the entry's odd mask may be performed by the inverter 60, the OR gate 62, and the AND gate 64. Specifically, the inverter 60 may represent inverting each bit in the input odd mask. Thus, each of the set bits is cleared (and vice versa). The result may be bitwise logically ORed with the entry's odd mask (represented by the OR gate 62). If the result is all binary one's, then each byte accessed by the memory operation being executed (indicated by set bits in the input odd mask, and thus by clear bits in the inverter result) is written by the store in the entry (assuming the odd offsets match). The AND gate 64 may represent logically ANDing each bit of the bitwise OR result, which results in a binary one on the output of the AND gate 64 if each bit in the bitwise OR result is set. The output of the AND gate 64 may then be qualified with the output of the comparator 52 (indicating that the odd offsets match) and the output of the comparator 46 (indicating the same cache block is being addressed), illustrated as AND gate 69. Additionally, it is possible that none of the bytes in the odd range are accessed (e.g. the input odd mask may be zero). The NOR gate 66 may represent logically NORing the input odd mask, with results in a binary one of the input odd mask is zero. The output of the NOR gate 66 may be ORed with the output of the AND gate 69 to generate the Fwd_odd signal (represented by the OR gate 68).

Figure 4:
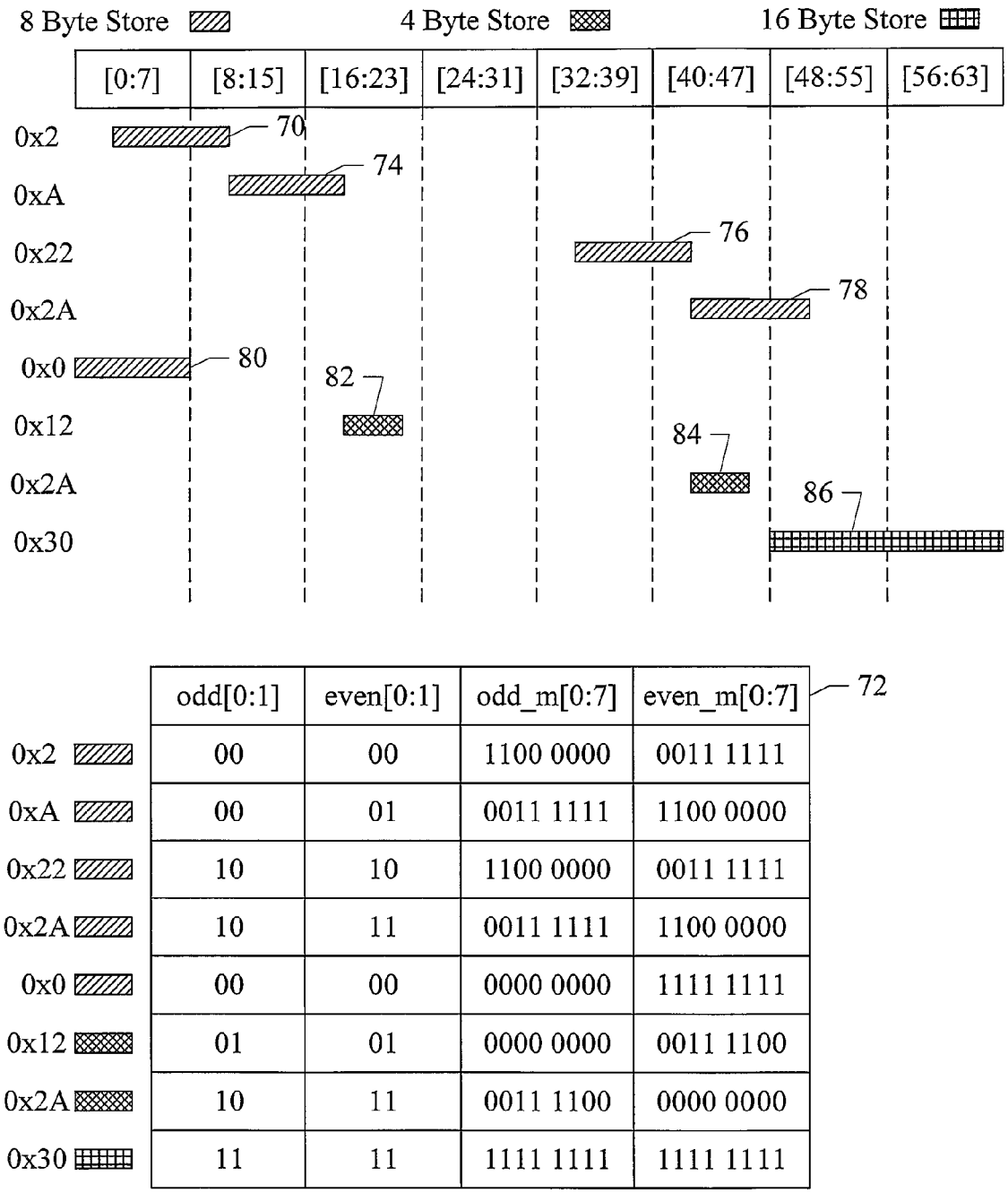
FIG. 4 is an example of various stores and the store queue entry encodings for one embodiment.

Turning now to FIG. 4, a block diagram is shown illustrating an example of various store operations and the corresponding odd and even offsets and odd and even masks for the store operations. The cache block is illustrated at the top of FIG. 4, with the byte range divisions shown and vertical dashed lines illustrating the range boundaries. Eight byte, four byte, and 16 byte stores are shown in the example as bars with different cross hatchings, as illustrated by the key at the top of FIG. 4.

The example shows various stores that have various corresponding addresses (only the least significant two nibbles of the address are shown) as horizontal bars with the cross hatching shown in the key. For example, an eight byte store beginning at 0x2 ("0x" refers to hexadecimal notation) is illustrated at reference numeral 70. A table 72 at the bottom of FIG. 4 (indexed by offset and store size, again according to the key at the top of FIG. 4) shows the corresponding odd and even offsets and odd and even masks. The odd and even offsets and masks are shown in binary in the table.

Accordingly, an eight byte store beginning at 0x2 (reference numeral 70) has odd and even offsets of "00", an odd mask of 1100 0000, and an even mask of 0011 1111 (first row of table 72). An eight byte store beginning at 0xA (reference numeral 74) has an odd offset of "00", but extends into even byte range "01" (second row of table 72). The corresponding even mask is 1100 0000, and the odd mask is 0011 1111 (second row of table 72). An eight byte store beginning at 0x22 (reference numeral 76) has odd and even offsets of "10", an odd mask of 1100 0000, and an even mask of 0011 1111 (third row of table 72). An eight byte store beginning at 0x2A (reference numeral 78) has an odd offset of "10", but extends into even byte range "11" (fourth row of table 72). The corresponding even mask is 1100 0000, and the odd mask is 0011 1111 (fourth row of table 72).

Each of the above examples is an eight byte misaligned store, which writes bytes in both an even and an odd byte range. Either the even byte range or the odd byte range may include the initial byte to be written (based on the address of the store). It is also possible for an eight byte aligned store to be represented (reference numeral 80). The corresponding entry in table 72 (fifth row) shows that one of the masks is all zero (the odd mask, in this case), thus indicating that the store does not write any bytes in the odd range. Similarly, smaller sized stores (whether misaligned or not) may only update one of the odd or even byte ranges. Two four byte stores are shown in the example (reference numerals 82 and 84) and the corresponding sixth and seventh rows of table 72 illustrate the odd and even offsets and masks. Lastly, a sixteen byte aligned store (reference numeral 86) is shown, along with the corresponding offsets and masks (last row of table 72).

Figure 5:
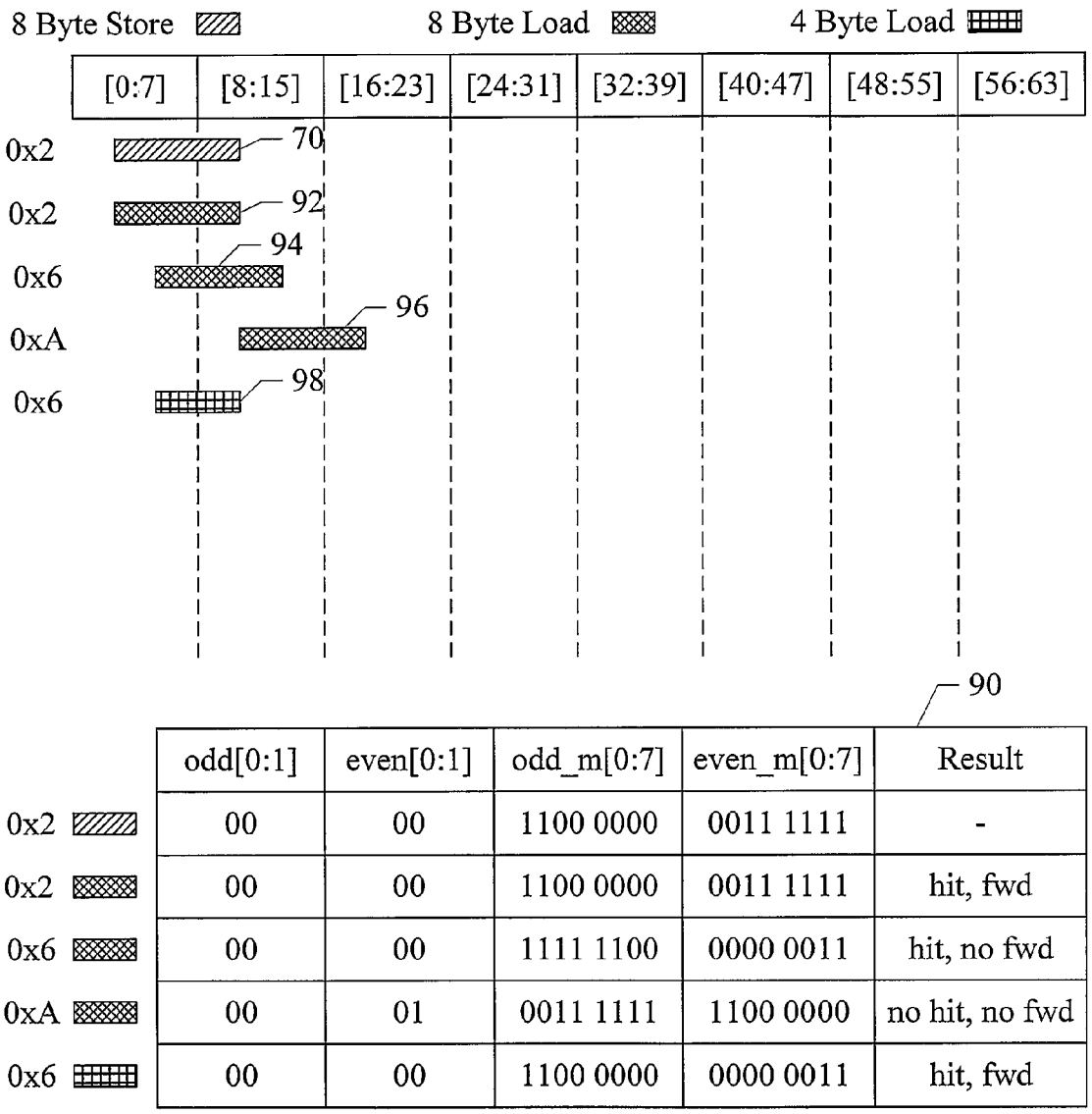
FIG. 5 is an example of a store and various loads for one embodiment.

FIG. 5 is an example illustrating the eight byte store at address 0x2 from FIG. 4 (reference numeral 70) along with various examples of eight byte loads and four byte loads that may hit or miss on the store. The key at the top of FIG. 5 identifies the eight byte store, the eight byte load, and the four byte load. A table 90 at the bottom of FIG. 5 illustrates the store and loads, along with their odd and even offsets and masks. For each load, the result of the dependency checking is also shown in table 90 ("Result" column).

The first eight byte load (reference numeral 92) also begins at address 0x2 and thus is fully overlapped by the eight byte store (reference numeral 70). As can be seen in the first two rows of table 90, the odd and even offsets match and the odd and even masks also match. Accordingly, a hit and a forward are signalled for the load.

The second eight byte load (reference numeral 94) begins at address 0x6, and thus reads some bytes written by the store but also some bytes not written by the store. The odd and even offsets match (first and third rows of table 90). Some of the even and odd mask bits match, but bits two to five of the odd mask of the load are set and the corresponding bits of the store odd mask are clear. Accordingly, a hit is signalled, but forwarding is not signalled.

The third eight byte load (reference numeral 96) begins at address 0xA, and thus does not overlap with the store. The even offsets do not match (first and fourth rows of table 90). The odd offsets match, but the odd masks share no common set bits. Accordingly, no hit and no forward is signalled.

A four byte load (reference numeral 98) beginning at address 0x6 is shown. The four byte load is completely overlapped by the store. Both the even and odd offsets match (first and fifth rows of table 90). The odd masks also match, so the Fwd_odd signal may be asserted. The even masks do not match, but each set bit of the load's even mask is also set in the store's even mask. Accordingly, the Fwd_even signal may be asserted as well. Accordingly, a hit and a forward are signalled.

Figure 6:
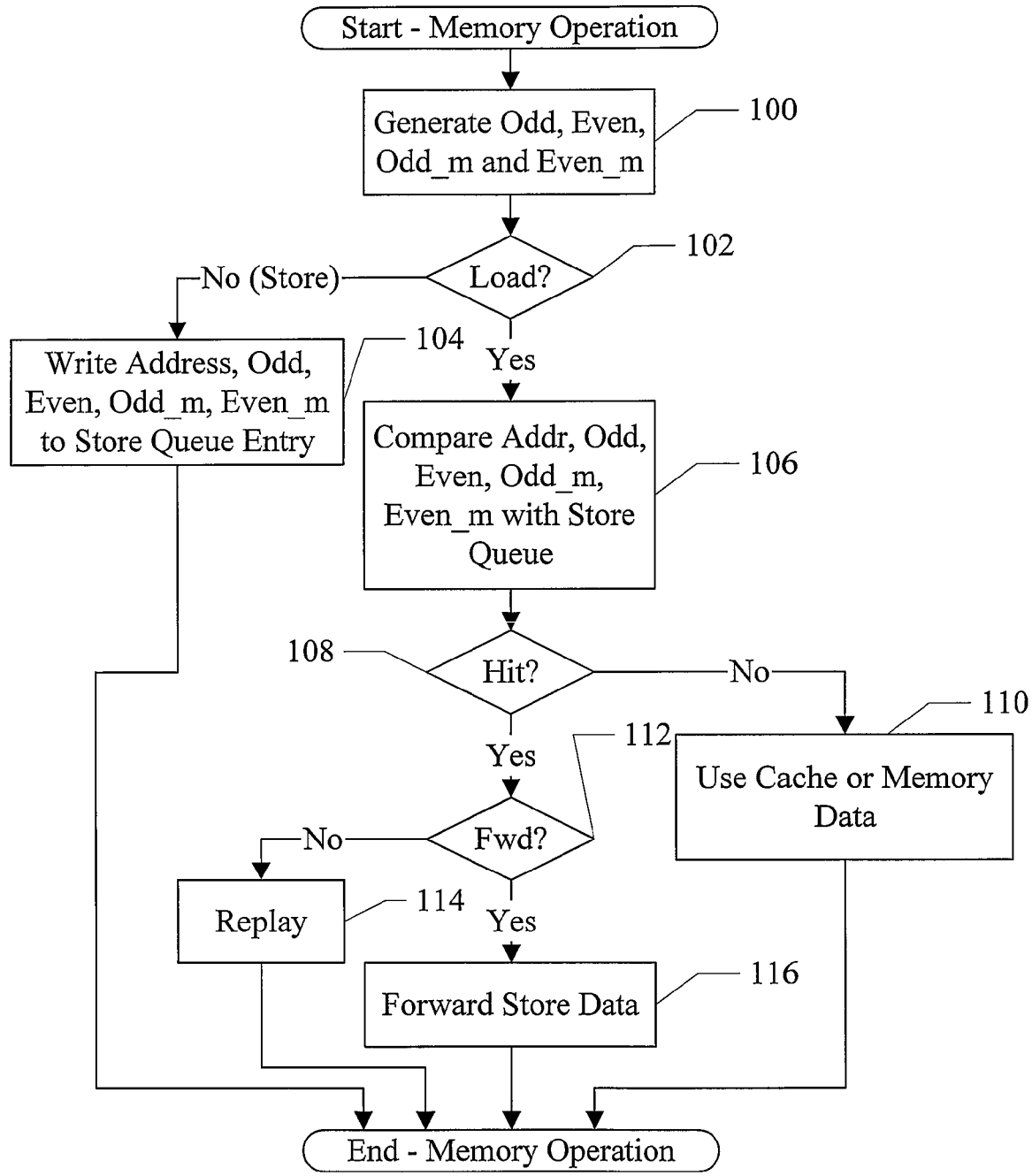
FIG. 6 is a flowchart illustrating operation of one embodiment of a load/store unit.

Turning now to FIG. 6, a flowchart illustrating operation of one embodiment of the processor 10 during execution of a memory operation is shown. While the blocks are shown in a particular order for ease of understanding, any order may be used. Furthermore, blocks may be performed in parallel in combinatorial logic. Blocks, combinations of blocks, and/or the flowchart as a whole may be pipelined.

For a given memory operation, the odd and even offsets and odd and even masks may be generated (block 100). The circuitry that generates the odd and even offsets and masks may be located in the AGU 26, or in the load/store unit 28, in various embodiments. The circuitry may be part of the control unit 32.

If the memory operation is a store (decision block 102, "no" leg), the control unit 32 may allocate an entry for the store and may write the cache block address, even and odd offsets, and even and odd masks to the allocated entry (block 104). If the memory operation is a load (decision block 102, "yes" leg), the control unit 32 may compare the address, the odd and even offsets, and odd and even masks of the load with the same data in each store queue entry. The comparison may be implemented, partially or fully, as content addressable memory (CAM) circuitry. If a hit is not detected (decision block 108, "no" leg), the cache or memory data may be provided as the result of the load (block 110). If a hit is detected (decision block 108, "yes" leg), but forwarding is not signalled (decision block 112, "no" leg), the load/store unit 28 may signal a replay (block 114). If a hit is detected (decision block 108, "yes" leg) and forwarding is signalled (decision block 112, "yes" leg), the load/store unit 28 may forward the store data as a result of the load (block 116).

It is noted that, while the above description refers to detecting loads hitting on previous stores, similar logic may also be used to detect a hit of a store on a previously executed load that is subsequent to the store in program order (i.e. a load executed "out of order"). To detect a store hitting on a previously executed, out of order load, the hit logic may be augmented with a comparison to detect relative order of loads and stores. For example, scheduler tags or other tagging mechanisms may provide values for comparison to detect ordering.

Numerous variations and modifications will become apparent to those skilled in the art once the above disclosure is fully appreciated. It is intended that the following claims be interpreted to embrace all such variations and modifications.

What is claimed is:

1. An apparatus comprising:

a queue comprising a plurality of entries;

a control unit coupled to the queue, wherein the control unit is configured to allocate a first entry of the plurality of entries to a store memory operation, wherein the control unit is configured to write a first base address, a first even offset, a first even mask, a first odd offset, and a first odd mask corresponding to the store memory operation to the first entry, and wherein the control unit is coupled to receive an input base address, an input even offset, and input even mask, an input odd offset, and an input odd mask that each correspond to a load memory operation, wherein the control unit is configured to determine if the store memory operation writes at least one byte read by the load memory operation responsive, at least in part, to the first base address, the first even offset, the first even mask, the first odd offset, the first odd mask, the input base address, the input even offset, the input even mask, the input odd offset and the input odd mask, and if the control unit determines that the store memory operation writes at least one byte read by the load memory operation by comparing the input base address, the input even offset, the input even mask, the input odd offset and the input odd mask to the first base address, the first even offset, the first even mask, the first odd offset and the first odd mask, respectively, the control unit is configured to signal a hit on the store memory operation;

wherein a group of contiguous memory locations are logically divided into alternately-addressed even and odd byte ranges, wherein a number of bytes in each byte range is an integer greater than one, and wherein a given store memory operation writes at most one even byte range and one adjacent odd byte range, and wherein a given store memory operation writes at least one of the even byte range and the adjacent odd byte range, and wherein at least one given store memory operation writes at least one byte in each of the even byte range and the adjacent odd byte range;

wherein the first even offset identifies a first even byte range in the group of contiguous memory locations that is potentially written by the store memory operation and the first odd offset identifies a first odd byte range in the group that is potentially written by the store memory operation; and wherein the first even mask identifies bytes within the first even byte range that are written by the store memory operation, and wherein the first odd mask identifies bytes within the first odd byte range that are written by the store memory operation, and wherein the first even mask comprises a first bit vector having a bit corresponding to each byte in the first even byte range;

wherein a state of the bit indicates whether or not the corresponding byte is written by the store memory operation; and wherein the first odd mask comprises a second bit vector having a bit corresponding to each byte in the first odd byte range;

wherein a state of the bit indicates whether or not the corresponding byte is written by the store memory operation.

2. The apparatus as recited in claim 1 wherein, if the control unit determines that the store memory operation writes each byte read by the load memory operation, the control unit is configured to cause store data to be forwarded for the load memory operation, wherein the control unit is configured to determine that the store memory operation writes each byte responsive, at least in part, to the first even offset, the first even mask, the first odd offset, the first odd mask, the input even offset, the input even mask, the input odd offset, and the input odd mask.

3. The apparatus as recited in claim 1 wherein the hit causes the load memory operation to be replayed if the store memory operation does not write each byte read by the load memory operation.

4. The apparatus as recited in claim 1 wherein determining if the store memory operation writes the load includes: bitwise logically ANDing the first even mask with the input even mask, bitwise logically ANDing the first odd mask with the input odd mask, determining whether or not the first even offset matches the input even offset, and determining whether or not the first odd offset matches the input odd offset.

5. The apparatus as recited in claim 4 wherein the store memory operation writes at least one byte read by the load if there is at least one set bit in a result of the bitwise logical ANDing of the first odd mask and the input odd mask, the input odd offset and the first odd offset match, and the load memory operation and store memory operation access the same group.

6. The apparatus as recited in claim 4 wherein the store memory operation writes at least one byte read by the load if there is at least one set bit in a result of the bitwise logical ANDing of the first even mask and the input even mask, the input even offset and the first even offset match, and the load memory operation and store memory operation access the same group.

7. The apparatus as recited in claim 1 wherein the group of contiguous memory locations is a cache block.

8. The apparatus as recited in claim 1 wherein the number of bytes in each byte range is greater than or equal to a maximum store size of a misaligned store memory operation.

9. A processor comprising:
a data cache configured to store data in units of cache blocks;
and a load/store unit coupled to the data cache and comprising a queue, wherein the load store unit is configured to allocate a first entry in the queue to a store memory operation, wherein the load/store unit is configured to write a first base address, a first even offset, a first even mask, a first odd offset, and a first odd mask corresponding to the store memory operation to the first entry;
wherein the load/store unit is configured to determine if the store memory operation writes at least one byte read by the load memory operation responsive, at least in part, to the first base address, the first even offset, the first even mask, the first odd offset, the first odd mask, an input base address, an input even offset, an input even mask, an input odd offset, and an input odd mask that each correspond to the load memory operation;
wherein if the load/store unit determines that the store memory operation writes at least one byte read by the load memory operation by comparing the input base address, the input even offset, the input even mask, the input odd offset and the input odd mask to the first base address, the first even offset, the first even mask, the first odd offset and the first odd mask, respectively, the load/store unit is configured to signal a hit on the store memory operation;
wherein a cache block is logically divided into alternately-addressed even and odd byte ranges, wherein a number of bytes in each byte range is an integer greater than one, and wherein a given store memory operation writes at most one even byte range and one adjacent odd byte range, and wherein the given store memory operation writes at least one of the even byte range and the adjacent odd byte range, and wherein at least one given store memory operation writes at least one byte in each of the even byte range and the adjacent odd byte range;
wherein the first even offset identifies a first even byte range in the cache block addressed by the store memory operation and the first odd offset identifies a first odd byte range in the cache block; and
wherein the first even mask identifies bytes within the first even byte range that are written by the store memory operation, and wherein the first odd mask identifies bytes within the first odd byte range that are written by the store memory operation, and wherein the first even mask comprises a first bit vector having a bit corresponding to each byte in the first even byte range, wherein a state of the bit indicates whether or not the corresponding byte is written by the store memory operation, and wherein the first odd mask comprises a second bit vector having a bit corresponding to each byte in the first odd byte range, wherein a state of the bit indicates whether or not the corresponding byte is written by the store memory operation.

10. The processor as recited in claim 9 wherein, if the load/store unit determines that the store memory operation writes each byte read by the load memory operation, the load/store unit is configured to forward store data for the load memory operation.

11. The processor as recited in claim 9 wherein, if the load/store unit determines that the store memory operation writes at least one byte read by the load memory operation but not each byte read by the load memory operation, the load/store unit is configured to replay the load memory operation.

12. A method comprising:
writing a first base address, a first even offset, a first even mask, a first odd offset, and a first odd mask corresponding to a store memory operation to a first entry in a queue, wherein a cache block is logically divided into alternately-addressed even and odd byte ranges, wherein a number of bytes in each byte range is an integer greater than one, and wherein a given store memory operation writes at most one even byte range and one adjacent odd byte range, and wherein the given store memory operation writes at least one of the even byte and the adjacent odd byte range, and wherein at least one given store memory operation writes at least one byte in each of the even range and the adjacent odd byte range; and
wherein the first even offset identifies a first even byte range in the cache block that is potentially written by the store memory operation and the first odd offset identifies a first odd byte range in the cache block that is potentially written by the store memory operation; and
wherein the first even mask identifies bytes within the first even byte range that are written by the store memory operation, and wherein the first odd mask identifies bytes within the first odd byte range that are written by the store memory operation;
and wherein the first even mask comprises a first bit vector having a bit corresponding to each byte in the first even byte, wherein a state of the bit indicates whether or not the corresponding byte is written by the store memory operation, and wherein the first odd mask comprises a second bit vector having a bit corresponding to each byte in the first odd byte range, wherein a state of the bit indicates whether or not the corresponding byte is written by the store memory operation;

receiving an input base address, an input even offset, an input even mask, an input odd offset, and an input odd mask that each corresponding to a load memory operation;

determining if the store memory operation writes at least one byte read by the load memory operation by comparing the input base address, the input even offset, the input even mask, the input odd offset and the input odd mask to the first base address, the first even offset, the first even mask, the first odd offset and the first odd mask, respectively.

13. The method as recited in claim 12 wherein further comprising:

determining that the store memory operation writes each byte read by the load memory operation, wherein determining that the store memory operation writes each byte is responsive, at least in part, to the first even offset, the first even mask, the first odd offset, the first odd mask, the input even offset, the input even mask, the input odd offset, and the input odd mask; and causing store data to be forwarded for the load memory operation responsive to determine that the store memory operation writes each byte.

14. The method as recited in claim 12 further comprising:

determining that the store memory operation writes at least one byte read by the load memory operation; and signalling a hit on the store memory operation responsive to determining that the store memory operation writes at least one byte that is read by the load memory operation but does not write all bytes that are read by the load memory operation.

15. The method as recited in claim 14 further comprising replaying the load memory operation responsive to the signalling and further responsive to the store memory operation not writing each byte read by the load memory operation.

16. The method as recited in claim 12 wherein determining if the store memory operation writes the load comprises:

bitwise logically ANDing the first even mask with the input even mask;

bitwise logically ANDing the first odd mask with the input odd mask;

determining whether or not the first even offset matches the input even offset; and determining whether or not the first odd offset matches the input odd offset.

17. The method as recited in claim 16 wherein the store memory operation writes at least one byte read by the load if there is at least one set bit in a result of the bitwise logical ANDing of the first odd mask and the input odd mask, the input odd offset and the first odd offset match, and the load memory operation and store memory operation access the same cache block, and wherein the store memory operation writes at least one byte read by the load if there is at least one set bit in a result of the bitwise logical ANDing of the first even mask and the input even mask, the input even offset and the first even offset match, and the load memory operation and store memory operation access the same cache block.

* * * * *

UNITED STATES PATENT AND TRADEMARK OFFICE
CERTIFICATE OF CORRECTION

PATENT NO.        : 7,721,066 B2
APPLICATION NO.   : 11/758193
DATED             : May 18, 2010
INVENTOR(S)       : Tse-yu Yeh et al.

Page 1 of 1

It is certified that error appears in the above-identified patent and that said Letters Patent is hereby corrected as shown below:

In column 7, line 23, delete "$Fwd_{13}$ odd" and insert -- Fwd_odd --, therefor.

In column 10, line 11, in Claim 1, after "entries;" insert -- and --.

In column 10, line 20, in Claim 1, delete "and" and insert -- an --, therefor.

In column 11, line 48, in Claim 9, delete "load store" and insert -- load/store --, therefor.

In column 12, line 52, in Claim 12, after "byte" insert -- range --.

In column 12, line 55, in Claim 12, after "even" insert -- byte --.

In column 13, line 1, in Claim 12, delete "byte," and insert -- byte range, --, therefor.

In column 13, line 10, in Claim 12, delete "corresponding" and insert -- correspond --, therefor.

Signed and Sealed this
Fifteenth Day of November, 2011

David J. Kappos
*Director of the United States Patent and Trademark Office*